United States Patent [19]

Elwell et al.

[11] Patent Number: 4,604,013
[45] Date of Patent: Aug. 5, 1986

[54] VEHICLE SIDE RAIL ASSEMBLY

[75] Inventors: Dennis L. Elwell, Johnston; Robert L. Sills, Polk City, both of Iowa

[73] Assignee: Dee Zee Manufacturing, Des Moines, Iowa

[21] Appl. No.: 691,414

[22] Filed: Jan. 14, 1985

[51] Int. Cl.$^4$ .............................................. B60P 7/06
[52] U.S. Cl. ...................................... 410/106; 296/41; 410/110; 410/116
[58] Field of Search ............... 224/326; 296/31 R, 41, 296/3, 10; 410/96, 101, 102, 106, 108, 110, 115, 116

[56] References Cited

U.S. PATENT DOCUMENTS

| | | | |
|---|---|---|---|
| 1,588,000 | 6/1926 | Barr | 296/41 |
| 3,765,713 | 10/1973 | Suitt | 296/3 |
| 3,841,690 | 10/1974 | Piercy | 296/10 |
| 4,248,558 | 2/1981 | Lechner | 410/110 X |
| 4,253,785 | 3/1981 | Bronstein | 410/110 |
| 4,440,333 | 4/1984 | Bott | 224/326 X |

Primary Examiner—Robert B. Reeves
Assistant Examiner—David F. Hubbuch
Attorney, Agent, or Firm—Henderson & Sturm

[57] ABSTRACT

A side rail assembly (10) for attachment to the upper wall (43) of a pick-up truck (20), the assembly (10) comprising a tread plate (12) adapted to fit over the upper wall (43); a tubular, open-ended side rail (21) having a portion (22) disposed parallel to and spaced above the tread plate (12) with end portions (23) engaging the tread plate (12), the bottom wall (29) of the rail (21) split longitudinally to form a slot (30) and having an angular seat formed by shoulders (32) in the bottom wall (29); a plurality of angular and tubular spacers (33) adapted to fit in a nested manner into the shoulder seat at any location therealong and to engage the tread plate (12); and carriage bolt fasteners (34) slidingly engaged with the rail (21) by the slot (30) and insertable through the spacers (33), the tread plate (12) and the side panel wall (43) to fasten the assembly (10) to the side panel (11), the fasteners (34) being hidden from view.

7 Claims, 6 Drawing Figures

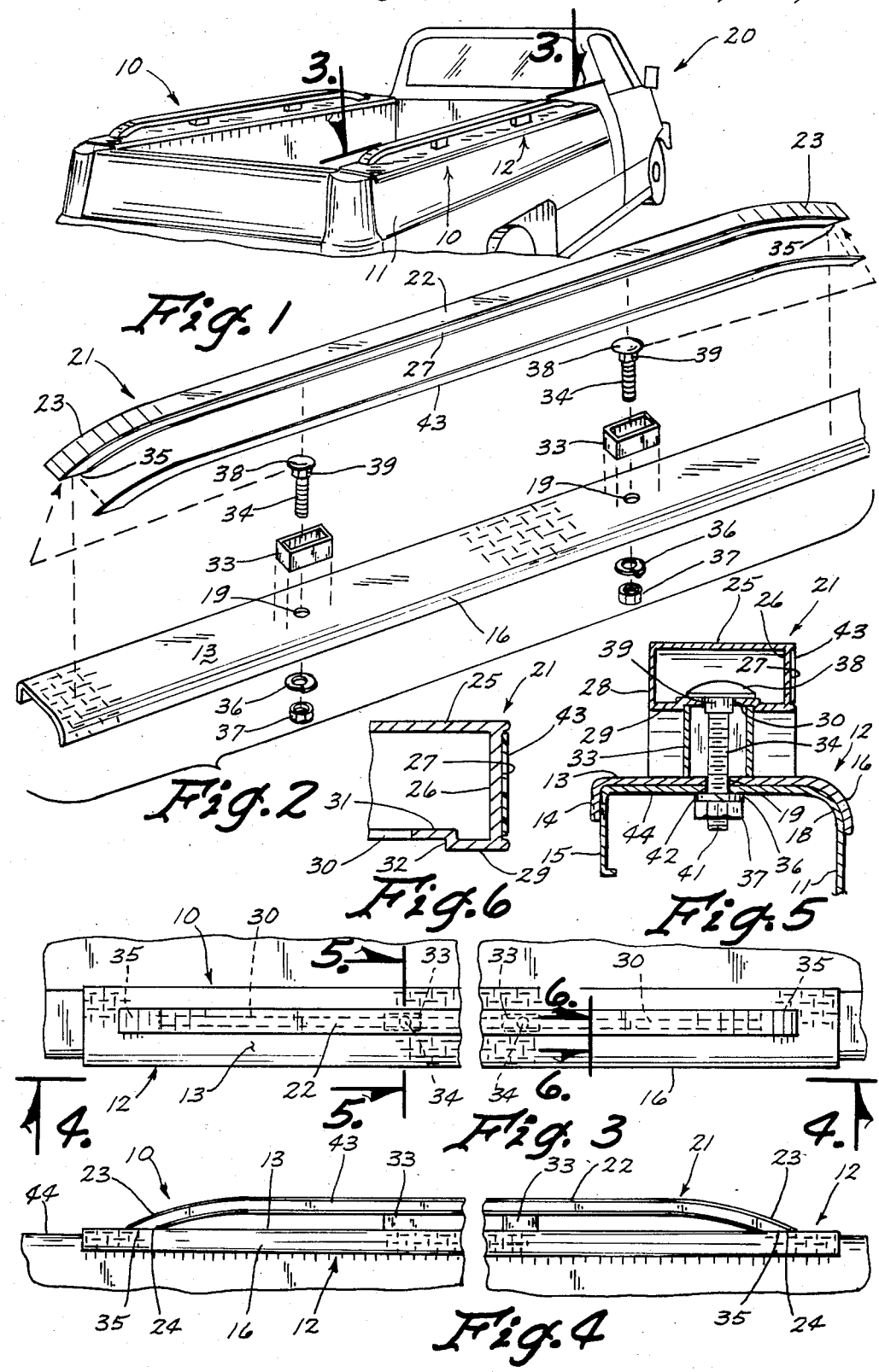

VEHICLE SIDE RAIL ASSEMBLY

TECHNICAL FIELD

The present invention relates generally to optional equipment used in connection with the rear side panels of pick-up vehicles, and more particularly to a side rail accessory device for attachment to the top of a pick-up truck side panel for use in tying down covering material for or cargo carried in the bed of the truck.

BACKGROUND ART

Various devices have been devised and used for attachment to parts of the rear bed panels, including the tailgate, of a pick-up truck for the purpose of providing means to which to secure straps, ropes and the like in order to tie down tarpaulins and/or loose cargo placed in the bed for transport. These devices comprise all kinds of projections, hooks, clasps, rings, rails and openings formed in the panels.

Side rails in general are known, examples of which are submitted herewith under separate cover, manufactured for example by Oliver Industries, Inc. of Orange, Conn., U.S.A.; however, known rails have known disadvantages of complexity and plurality of parts, and lack of sturdiness and rigidity for their intended purposes.

DISCLOSURE OF THE INVENTION

The above problems are substantially resolved, without undue compromise of other desirable attributes that are already provided by prior art devices, by the provision of the invention disclosed herein.

The present invention relates generally to an apparatus for tying down tarpaulins and/or cargo in a pick-up truck bed to protect same from inclement weather and from potentially damaging movement in the bed during transportation of the cargo. The apparatus comprises a pair of identical side rail assemblies each to be secured to the top surface of a side panel of the rear bed of the truck.

Each side rail assembly comprises an elongated tread plate adapted to fit over and be secured to the top of a side panel, a side rail having a length about that of the side panel, and a plurality of fastening devices which rigidly and securely fasten the side rail in a position primarily spaced above and disposed parallel to the tread plate. This arrangement enables ropes and like fastening means to be passed above, below and around the side rail for tying purposes, and with a pair of the side rail assemblies in place, a cover for the open bed or cargo placed therein may be readily and securely fastened in place to and in the truck bed.

Advantages are obtained by each side rail having a split bottom wall within which a carriage bolt head can be slidably inserted from either end of the rail to any desirable location along the rail whereby to hide the bolt heads for aesthetic purposes. An indentation is formed also by the split bottom wall such that tubular spacers can be locked therein to both separate and rigidly support the side rail over the tread plate, with the spacers providing the further synergistic function of embracing a carriage bolt therein to again hide the bolt from view. With the spacers locked into the side rail against rotation, twisting or bending of the side rail is greatly prevented and their sturdiness for tie down purposes is greatly enhanced. Furthermore, a very attractive side rail assembly is provided without compromising on its ruggedness, the latter being its most important function.

BEST DESCRIPTION OF THE DRAWINGS

These and other attributes of the invention will become more clear upon a thorough study and review of the following detailed description of the best mode for carrying out the invention, particularly when reviewed in conjunction with the drawings, wherein:

FIG. 1 comprises a fragmentary perspective view of a pick-up vehicle showing use of the side rail assemblies;

FIG. 2 is an enlarged exploded, perspective view of one side rail assembly of the invention, both assemblies being identical;

FIG. 3 is a slightly reduced, foreshortened, plan view of a side assembly in place on the pick-up truck, taken along line 3—3 in FIG. 1;

FIG. 4 is a side elevational view taken along line 4—4 in FIG. 3;

FIG. 5 is an enlarged vertical sectional view taken along line 5—5 in FIG. 3; and FIG. 6 is a fragmentary, enlarged elevational view taken along line 6—6 in FIG. 3.

BEST MODE FOR CARRYING OUT THE INVENTION

Referring now to the drawings, and in particular to FIG. 1, the side rail assembly of this invention is seen as depicted generally by the numeral 10. A pair of side rail assemblies (10) are fastened to the upper surface of the side panels (11), respectively, of a conventional pick-up truck (20). As each side rail assembly (10) is identical, only one will be described.

Each side rail assembly (10) comprises a tread plate (12) best shown in FIGS. 2 and 5, the tread plate (12) having a generally flat portion (13), a downwardly extended inner portion (14) adapted to fit snugly against the inner surface (15) of the side panel (11), with the tread plate (12) having an outwardly and downwardly curved portion (16) adapted to fit over the like curved surface (18) of a side panel (11); and further with a plurality of holes (19) (FIG. 2) formed in spaced relation centrally of the upper portion (13) of each tread plate (12).

Each side rail assembly (10) includes further an elongated side rail (21) having approximately the length of the tread plate (12) to which it is connected, with the tread plate (12) having a length sufficient to cover the approximate length of each side panel (11). Each side rail (21) has a straight portion (22) (FIG. 4) with downwardly curved end portions (23), each end portion (23) having a flattened base (24) adapted to engage the flat upper surface of the tread plate portion (13) (FIG. 4).

Referring to FIGS. 3, 5 and 6, the side rail (21) includes a top wall (25), a depending outer side wall (26) having an indentation (27) formed therein, a depending inner side wall (28), and a bottom wall (29) having an elongated slot (30) formed therein which runs between the innermost ends (35) of the side rail (21) (FIG. 3). The inner portions (31) (FIGS. 5 and 6) of the split bottom wall (29) on either side of the slot (30) are raised by right angular shoulders (32) to form a rectangular seat in vertical cross-section for purposes hereinafter detailed.

The side rail assembly (10) is completed by the provision of a tubular rectangular spacer (33) (FIGS. 2 and 5), each placed above a carriage bolt hole (19) with the upper end nested into so as to be locked in the seat portion (32) of the side rail (21); with a carriage bolt (34), lock washer (36) and nut (37) fastening the side rail (21) to the tread plate (12) as best illustrated in FIG. 5.

To assemble the side rail (21) to the tread plate (12), the head (38) and shank (39) of each carriage bolt (34) is inserted into one of the open ends of the side rail (21), the bolt head (38) sliding on top of the bottom wall portions (31) (FIG. 5) with the shank (39) sliding along the elongated slot (30) of the rail (21). With the rail (21) centered over the tread plate (12), with a rectangular spacer (33) in place as illustrated in FIGS. 2 and 5, and with each bolt (34) located above a spacer (33), the combined rail (21) and bolts (34) are then lowered such that the bolts pass through the spacers (33) and the holes (19) whereby the lower end (41) of each bolt protrudes a sufficient distance through the tread plate (12) such that it also can pass through an opening (42) (FIG. 5) formed in the upper flat wall (44) of the side panel (11) to enable the bolt to be fastened below the side panel wall (44) with the washer (36) and nut (37).

As best seen in FIG. 5, the location and placement of each carriage bolt (34) holds the side rail (21) snugly and tightly on top of the tread plate (12), with the upper portion (22) of the rail (21) disposed parallel to and spaced from the surface of the tread plate (12). The ruggedness of this structure is enhanced by the fact that the side rail (21) and the spacers (33) are locked together against relative rotational movement about a common vertical axis, the spacers (33) being unable to turn or twist in place due to their upper portions being nested into the lower portions of the side rails (21).

A trim strip (43) (FIGS. 2 and 6) may be adhered to the outer surface of the indentation (27) formed in the outer side wall (26) of the side rail (21) for aesthetic purposes. The aesthetics of the side rail assemblies (10) are further enhanced by the fact that all fastening devices such as the carriage bolts (34) and associated parts are hidden from view, as best seen in FIG. 4.

Obviously, many modifications and variations of the present invention are possible in light of the above teachings. It is therefore to be understood that, within the scope of the appended claims, the invention may be practiced otherwise than as specifically described therein.

We claim:

1. A side rail assembly for attachment to a side panel of a pick-up truck or like vehicle, the side panel having an upper wall with at least one opening formed therein for attachment purposes, the side rail assembly comprising:
   (a) tread plate means formed to fit over the side panel upper wall and having at least one opening adapted to register with at least one of the respective upper wall openings;
   (b) side rail means having a center portion spaced from said tread plate means;
   (c) spacer means disposed between said tread plate means and side rail means in nested engagement with said side rail means whereby said spacer means and side rail means are locked together against relative rotational movement about a common axis; and
   (d) means insertable through said registered openings for fastening said tread plate means, side rail means and spacer means together and to the side panel upper wall.

2. The side rail assembly of claim 1 wherein said side rail means comprises an elongated, tubular member having formed in the bottom thereof an angular seat in cross-section, which seat extends longitudinally thereof.

3. The side rail assembly of claim 1 wherein said side rail means comprises an elongated tubular member having at least one open end and having a slot formed longitudinally thereof within the bottom of the member, one end of the slot being at said open end.

4. The side rail assembly of claim 3 wherein said tubular member has formed in the bottom thereof an angular seat in cross-section, which seat extends longitudinally of said tubular member.

5. The side rail assembly of claim 3 wherein said side rail tubular member slot is formed centrally of the bottom wall thereof such that said bottom wall is split longitudinally of said tubular member and further wherein said fastening means includes at least one carriage bolt the shank of which is slidably movable into said slot from said open end, with the enlarged head of said one bolt disposed within said tubular member and engageable with the upper surfaces of said bottom wall on either side of said slot.

6. The side rail assembly of claim 1 wherein said spacer means includes an element having an angular upper portion adapted to nest into a like angular seat formed in the base of said side rail means.

7. The side rail assembly of claim 6 wherein said element has an opening formed therewithin whereby said fastening means is insertable therethrough.

* * * * *